UNITED STATES PATENT OFFICE.

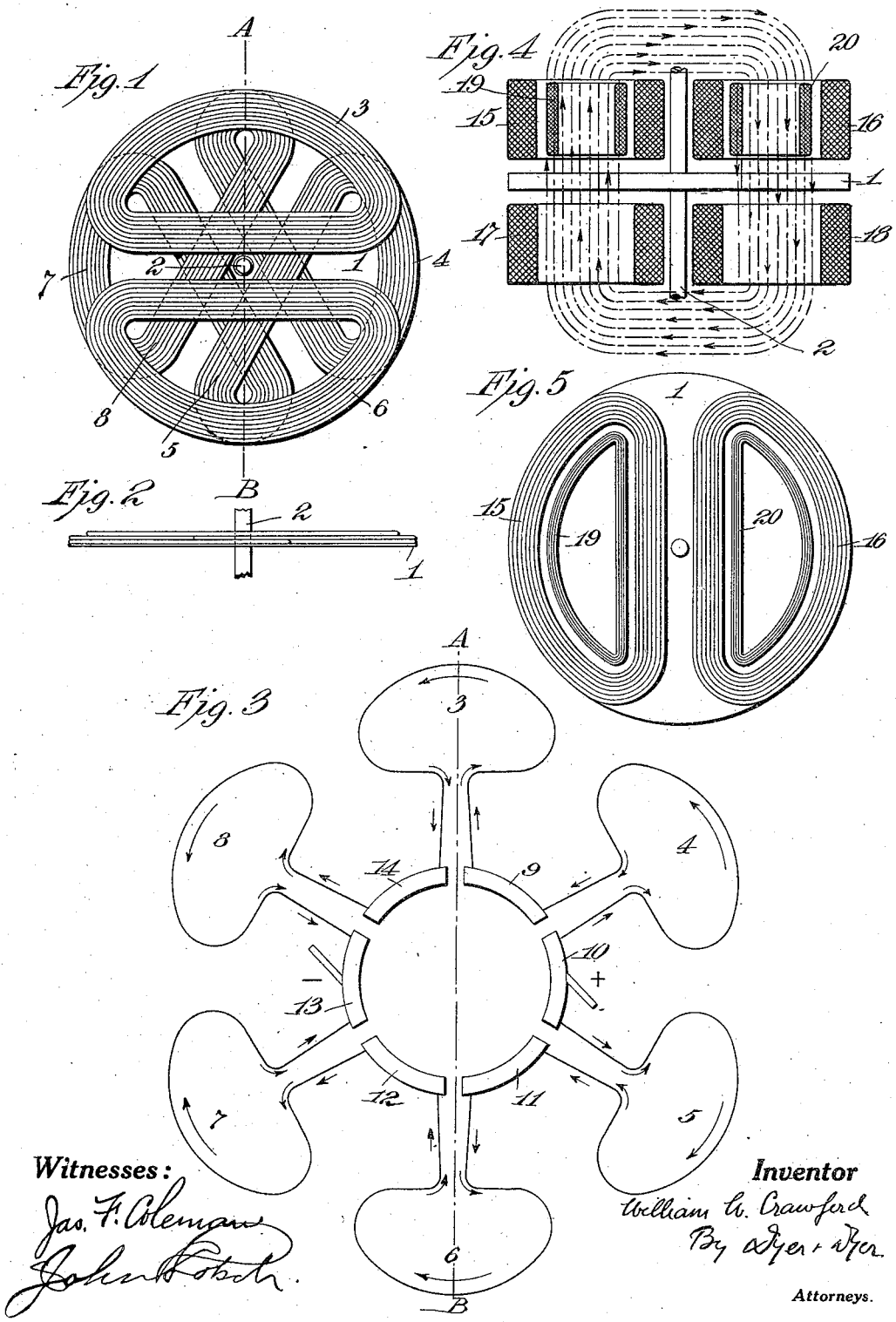

WILLIAM W. CRAWFORD, OF NEW YORK, N. Y., ASSIGNOR OF ONE-HALF TO WILSON S. HOWELL, OF NEW YORK, N. Y.

ELECTRIC MEASURING INSTRUMENT.

1,066,084.     Specification of Letters Patent.      Patented July 1, 1913.

Application filed February 8, 1909. Serial No. 476,640.

*To all whom it may concern:*

Be it known that I, WILLIAM W. CRAWFORD, a citizen of the United States, residing in the borough of Manhattan, city, county, and State of New York, have invented a certain new and useful Electric Measuring Instrument, of which the following is a full, clear, concise, and exact description, reference being had to the accompanying drawings, forming part of this specification.

The general object I have in view is the production of a new and improved meter, such as an integrating watt meter, which will be a static or in other words, free from stray field effects, and will be of simple and compact form.

My invention will be understood from the following description, taken in connection with the accompanying drawing, which sets forth one embodiment thereof.

Figure 1 is a plan view of the coils of the armature of an integrating watt meter, embodying the invention. Fig. 2 is a side elevation of the armature and coils. Fig. 3 is a diagrammatical view of the coils and commutator connections. Fig. 4 is a cross sectional view, partly diagrammatic of the field, and Fig. 5 is a plan view of the same.

In all views like parts are designated by the same reference characters.

All of these views represent one embodiment of the invention, as applied to an integrating watt meter of the type employing a disk armature.

In carrying out my invention, I provide means whereby the effect of an external field on one part of the armature shall be in one direction, while the effect on another part is in the opposite direction, so that the resultant effect is practically *nil*. I so distribute the meter field, that it will be in opposite directions in the above mentioned parts of the armature, thereby furnishing effects which are additive in producing meter torque.

So far as I am aware, there are two ways of producing an astatic system for a meter. One consists in using two separate and similar drum armatures on the same shaft with their coils oppositely connected; the other method consists in the use of a multi-polar drum armature, which is usually four-poled. These types of meter are objectionable for a number of reasons, particularly the added complexity of construction, the added dimensions and weight of certain parts.

One way of carrying out my invention is to employ an armature which consists of a number of suitably supported flat overlapping coils. This will produce a field or fields in opposite directions in different parts of the armature in producing the normal torque of the meter. Figs. 1, 2 and 3 illustrate the application of this principle to a bi-polar meter. The armature is shown as having a support for the armature coils in the form of a disk 1 mounted on a shaft 2. Six coils are shown and are indicated by the characters 3, 4, 5, 6, 7 and 8. The number of coils illustrated is chosen solely for the purpose of illustration. Each of the coils shown in Fig. 1, is of segment or D shape and spans about one-half of the circumference of the disk. The arc of each segment lies outward and the chord inward upon the disk. The coils are arranged in pairs, with the chords of each pair in parallelism and on opposite sides of the axis of the disk. These coils lie flatwise on the disk, and the several pairs overlap one another. The coils are connected between adjacent commutator segments 9, 10, 11, 12, 13 and 14, in the manner diagrammatically indicated in Fig. 4, the connection being similar to those of a bi-polar drum armature. The shape of the coils, shown in Figs. 1, 2 and 3 is advantageous, although other shapes might be used with the same effect.

Referring to Fig. 1, and taking the line A—B as the axis of commutation, the currents will be flowing from the center on one side of the armature and toward the center on the other side, and a uniform field in these two regions produces equal and opposite torques—the result of which will be zero. A non-uniform field will in the same manner produce torques, the difference of which will in most practical cases be negligible. A meter field is used which passes in opposite directions in the two halves of the armature above described and thus produces additive torques. A winding suitable for producing this field is illustrated in Fig. 4. The winding as shown comprises four coils, 15, 16, 17 and 18, placed in pairs on opposite sides of the armature. The coils 15 and 17 produce a field across one-half of the armature in one direction, while the coils 16 and 18 produce a field across the other half in an opposite direction. The direction of the field is shown on dotted lines and arrows in the figure. The pole areas of the field coils 15, 16, 17 and 18, are substantially equal to the pole areas of the armature coils which cover substantially one-half the area of the disk upon which they are mounted. I regard these proportions and arrangements of parts as most efficient for carrying out my invention.

For the purpose of compensating for friction for light load adjustment, I employ the coils 19 and 20, such coils being of fine wire and connected in the armature circuit and located in substantially the same relation to the armature as the field winding.

It is apparent that, while the above description applies to a bi-polar meter, the principle involved will apply equally as well to a multi-polar meter having a disk armature.

In accordance with the provisions of the patent statutes, I have described the principle of my invention, together with the apparatus which I now consider to represent the best embodiment thereof; but I desire to have it understood that the apparatus shown is merely illustrative and that the invention can be carried out in other ways.

Having now described my invention, what I claim as new and desire to secure by Letters Patent, is:

1. In an astatic motor watt-hour meter, an armature comprising a rotatable shaft, an armature coil support thereon, a plurality of flat armature coils secured to said support overlapping one another, and field coils having substantially the same pole area as the armature coils located above and below said armature coils at diametrically opposite points and producing fields through said armature coils in opposite directions.

2. In an astatic motor watt-hour meter, an armature comprising a rotatable shaft, an armature coil support thereon, a plurality of flat armature coils each having a pole area approximately equal to one-half the area within the periphery of said support and secured to said support overlapping one another, and field coils having substantially the same pole area as the armature coils located above and below said armature coils at diametrically opposite points and producing fields through said armature coils in opposite directions.

3. An electric meter comprising a disk armature constructed with overlapping coils arranged in opposite pairs, each coil spanning approximately half the circumference, and a field consisting of four coils located in symmetrically opposite pairs in planes parallel to the armature and connected in series in such a manner that the two coils facing one another on one side of the axis assist in producing a field through that side of the armature in one direction, while the other pair of coils located on the opposite side of the axis of the armature assist in producing a field through the armature in the opposite direction.

This specification signed and witnessed this 28th day of Jan., 1909.

WILLIAM W. CRAWFORD.

Witnesses:
 LEONARD H. DYER,
 JOHN L. LOTSCH.

---

Copies of this patent may be obtained for five cents each, by addressing the "Commissioner of Patents, Washington, D. C."